US012388678B2

(12) United States Patent
Huang

(10) Patent No.: US 12,388,678 B2
(45) Date of Patent: Aug. 12, 2025

(54) VXLAN ACCESS AUTHENTICATION METHOD AND VTEP DEVICE

(71) Applicant: HUAWEI TECHNOLOGIES CO., LTD., Guangdong (CN)

(72) Inventor: Zhengquan Huang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 295 days.

(21) Appl. No.: 17/973,812

(22) Filed: Oct. 26, 2022

(65) Prior Publication Data
US 2023/0048013 A1 Feb. 16, 2023

Related U.S. Application Data

(63) Continuation of application No. PCT/CN2021/089790, filed on Apr. 26, 2021.

(30) Foreign Application Priority Data

Apr. 27, 2020 (CN) .......................... 202010344197.6

(51) Int. Cl.
*H04L 9/40* (2022.01)
*H04L 12/46* (2006.01)
(Continued)

(52) U.S. Cl.
CPC ........ *H04L 12/4641* (2013.01); *H04L 63/083* (2013.01); *H04L 63/0853* (2013.01); *H04L 67/02* (2013.01)

(58) Field of Classification Search
CPC ... H04L 63/0853; H04L 63/083; H04L 63/08; H04L 63/0884; H04L 63/10; H04L 67/02;
(Continued)

(56) References Cited

U.S. PATENT DOCUMENTS

2014/0092907 A1* 4/2014 Sridhar ................ H04L 69/324
370/392
2016/0323184 A1 11/2016 Li et al.
2016/0381015 A1 12/2016 Ravinutala et al.
2018/0309595 A1* 10/2018 Ma ...................... H04L 12/4633
(Continued)

FOREIGN PATENT DOCUMENTS

CN 107104872 A 8/2017
CN 107547325 A 1/2018
(Continued)

OTHER PUBLICATIONS

M. Mahalingam et al., "Virtual extensible Local Area Network (VXLAN): A Framework for Overlaying Virtualized Layer 2 Networks over Layer 3 Networks", Request for Comments: 7348; Independent Submission, Category: Informational, Aug. 2014, Total 22 Pages.

*Primary Examiner* — Vu V Tran
(74) *Attorney, Agent, or Firm* — WOMBLE BOND DICKINSON (US) LLP

(57) ABSTRACT

A VXLAN access authentication method includes: An authentication point device receives a VXLAN authentication packet, where the VXLAN authentication packet is a VXLAN packet. The VXLAN authentication packet includes a VXLAN header and an authentication request sent by a terminal, the VXLAN header includes a first VNI, and the authentication request includes an authentication credential. The authentication point device obtains permission of the terminal or a second VNI based on the authentication credential. The permission of the terminal corresponds to the second VNI. The authentication point device sends the permission of the terminal or the second VNI to a control point device, where the control point device is a device that encapsulates the authentication request into the VXLAN authentication packet. In this application, VXLAN access authentication is performed on an overlay network, (Continued)

so that configuration complexity can be reduced when a VXLAN access authentication mode is modified or created.

15 Claims, 7 Drawing Sheets

(51) Int. Cl.
*H04L 69/22* (2022.01)
*H04L 67/02* (2022.01)

(58) Field of Classification Search
CPC ............... H04L 69/22; H04L 12/4641; H04L 2012/4629
See application file for complete search history.

(56) References Cited

U.S. PATENT DOCUMENTS

| | | | |
|---|---|---|---|
| 2019/0013968 A1* | 1/2019 | Xie | H04L 63/08 |
| 2019/0132322 A1* | 5/2019 | Song | H04L 63/101 |
| 2019/0141036 A1* | 5/2019 | Shi | H04L 12/4633 |
| 2019/0222434 A1* | 7/2019 | Ye | H04L 12/4641 |

FOREIGN PATENT DOCUMENTS

| | | |
|---|---|---|
| CN | 107547345 A | 1/2018 |
| CN | 107659485 A | 2/2018 |
| CN | 108462683 A | 8/2018 |
| CN | 110650076 A | 1/2020 |
| CN | 110768889 A | 2/2020 |
| CN | 110943901 A | 3/2020 |
| EP | 3410648 A1 | 12/2018 |
| WO | 2017143611 A1 | 8/2017 |
| WO | 2019024844 A1 | 2/2019 |

* cited by examiner

VXLAN ACCESS AUTHENTICATION METHOD AND VTEP DEVICE

CROSS-REFERENCE TO RELATED APPLICATIONS

This application is a continuation of International Application No. PCT/CN2021/089790, filed on Apr. 26, 2021, which claims priority to Chinese Patent Application No. 202010344197.6, filed on Apr. 27, 2020. The disclosures of the aforementioned applications are hereby incorporated by reference in their entireties.

TECHNICAL FIELD

This application relates to the field of network communication, and in particular, to a virtual extensible local area network (Virtual Extensible LAN, VXLAN) access authentication method and a VXLAN tunnel endpoint (VTEP) device.

BACKGROUND

VXLAN is a network virtualization technology that encapsulates a user datagram protocol (UDP) header before a media access control (MAC) header. In the VXLAN, a basic physical network is usually referred to as an underlay network, and a virtualized network is usually referred to as an overlay network. To enable users to quickly access the VXLAN, a control point device can provide an automatic access function for the users. As shown in FIG. 1, a user uses a terminal 101 to send an authentication request to a control point device 102. The control point device 102 supports an underlay network and an overlay network, and traffic on the underlay network may enter the overlay network through a traffic encapsulation point. An authentication module on the underlay network initiates the authentication request to an authentication server 103 through the underlay network based on a source MAC address carried in the authentication request. The control point device 102 receives an authentication result for the source MAC address from the authentication server 103 through the underlay network. When the authentication result is that the authentication succeeds, the control point device 102 performs VXLAN packet encapsulation on traffic of the terminal 101 at the traffic encapsulation point, so that the traffic enters the overlay network, and then enters a corresponding VXLAN network.

Currently, access authentication for VXLAN traffic is performed on the underlay network. The traffic can enter the overlay network only after the access authentication for the traffic on the underlay network succeeds. If an access authentication mode needs to be modified, corresponding configuration needs to be performed on both the underlay network and the overlay network, resulting in cumbersome configuration.

SUMMARY

This application provides a VXLAN access authentication method and a VTEP device, to reduce configuration complexity.

A first aspect of this application provides a VXLAN access authentication method, including:

An authentication point device may receive, through a VXLAN tunnel, a VXLAN authentication packet sent by a control point device. The VXLAN authentication packet is a VXLAN packet, the VXLAN authentication packet includes a VXLAN header and an authentication request sent by a terminal, the VXLAN header includes a first VXLAN network identifier (VNI), and the authentication request includes an authentication credential. The authentication point device obtains network access permission of the terminal or a second VNI based on the authentication credential. The network access permission of the terminal corresponds to the second VNI. The authentication point device sends the network access permission of the terminal or the second VNI to the control point device, where the control point device is a device that encapsulates the authentication request into the VXLAN authentication packet.

Because the VXLAN authentication packet is a VXLAN packet, VXLAN access authentication is performed on an overlay network. VXLAN access authentication is performed on the overlay network, so that corresponding configuration needs to be performed on only the overlay network when a VXLAN access authentication mode is modified or created. This reduces configuration complexity.

Based on the first aspect of this application, in a first embodiment of the first aspect of this application, no data traffic runs on a VXLAN network corresponding to the first VNI. In VXLAN access authentication, the VXLAN network corresponding to the first VNI serves as a pre-authentication domain for access authentication. Different users or terminals can obtain network access permission or VNIs through the pre-authentication domain. No data traffic runs on the VXLAN network corresponding to the first VNI, so that VXLAN access authentication efficiency can be improved.

Based on the first aspect of this application, in a second embodiment of the first aspect of this application, VXLAN access authentication in this application uses a Portal authentication mode based on the hypertext transfer protocol (HTTP) or the secure hypertext transfer protocol (HTTPS). Before the authentication point device receives the VXLAN authentication packet, the authentication point device may receive a first VXLAN packet sent by the control point device, where the first VXLAN packet includes a first VXLAN header and a first HTTP request, and the first VXLAN header includes the first VNI. The first HTTP request may be a first HTTPS request. After the authentication point device receives the first VXLAN packet, the authentication point device sends a second VXLAN packet to the control point device, where the second VXLAN packet includes a second VXLAN header and an HTTP redirect packet, the second VXLAN header includes the first VNI, and the HTTP redirect packet includes a uniform resource identifier URI) of a portal server.

The first VXLAN header includes the first VNI, and the second VXLAN header also includes the first VNI, that is, data transmission before access authentication is performed on the VXLAN network corresponding to the first VNI. In the Portal authentication mode, before access authentication, all data is transmitted on the VXLAN network corresponding to the first VNI, so that management can be convenient.

Based on any one of the first aspect of this application or the first and the second embodiments of the first aspect of this application, in a third embodiment of the first aspect of this application, the control point device is an edge device, and the authentication point device is a border device. The border device is a VXLAN network egress corresponding to the first VNI, represents an interconnection device between the VXLAN network and an external network, and is usually a layer 3 gateway of the VXLAN network. The edge device is connected to the terminal. Usually, one border device can be connected to a plurality of edge devices, and each edge device can complete VXLAN access authentication with one border device. Centralized authentication is performed on the border device and VXLAN packet encapsulation for each authentication request is performed on the edge device, so that configuration and management of VXLAN access authentication can be simplified.

Based on any one of the first aspect of this application or the first to the third embodiments of the first aspect of this application, in a fourth embodiment of the first aspect of this application, the first VNI is a default VNI for VXLAN authentication. In an embodiment, when the authentication point device receives a packet whose VXLAN header includes the first VNI, the authentication point device considers by default that the packet is a packet related to VXLAN access authentication, and performs corresponding processing accordingly. The authentication point device may not only belong to the VXLAN network corresponding to the first VNI, but also belong to a VXLAN network corresponding to another VNI. The first VNI is used as the default VNI for VXLAN authentication, so that processing efficiency of the authentication point device can be improved.

A second aspect of this application provides a VXLAN access authentication method, including:

A control point device sends a VXLAN authentication packet to an authentication point device through a VXLAN tunnel, where the VXLAN authentication packet is a VXLAN packet. The VXLAN authentication packet includes a VXLAN header and an authentication request sent by a terminal, the VXLAN header includes a first VXLAN network identifier VNI, and the authentication request includes an authentication credential. The control point device receives permission of the terminal or a second VNI. The permission of the terminal corresponds to the second VNI. The permission of the terminal or the second VNI is obtained by the authentication point device based on the authentication credential. After the control point device receives the permission of the terminal or the second VNI, the control point device encapsulates a packet from the terminal into a VXLAN packet on a VXLAN network corresponding to the second VNI.

Because the VXLAN authentication packet is a VXLAN packet, VXLAN access authentication is performed on an overlay network. VXLAN access authentication is performed on the overlay network, so that corresponding configuration needs to be performed on only the overlay network when a VXLAN access authentication mode is modified or created. This reduces configuration complexity.

Based on the second aspect of this application, in a first embodiment of the second aspect of this application, no data traffic runs on a VXLAN network corresponding to the first VNI. In VXLAN access authentication, the VXLAN network corresponding to the first VNI serves as a pre-authentication domain for access authentication. Different users or terminals can obtain network access permission or VNIs through the pre-authentication domain. No data traffic runs on the VXLAN network corresponding to the first VNI, so that VXLAN access authentication efficiency can be improved.

Based on the second aspect of this application, in a second embodiment of the second aspect of this application, VXLAN access authentication in this application uses a Portal authentication mode based on HTTP or HTTPS. Before the control point device sends the VXLAN authentication packet to the authentication point device, the control point device sends a first VXLAN packet to the authentication point device, where the first VXLAN packet includes a first VXLAN header and a first HTTP request, the first HTTP request may be a first HTTPS request, and the first VXLAN header includes the first VNI. The control point device may further receive a second VXLAN packet sent by the authentication point device, where the second VXLAN packet includes a second VXLAN header and an HTTP redirect packet, the second VXLAN header includes the first VNI, and the HTTP redirect packet includes a URI of a portal server.

The first VXLAN header includes the first VNI, and the second VXLAN header also includes the first VNI, that is, data transmission before access authentication is performed on the VXLAN network corresponding to the first VNI. In the Portal authentication mode, before access authentication, all data is transmitted on the VXLAN network corresponding to the first VNI, so that management can be convenient.

Based on any one of the second aspect of this application or the first and the second embodiments of the second aspect of this application, in a third embodiment of the second aspect of this application, the control point device is an edge device, and the authentication point device is a border device. Centralized authentication is performed on the border device and VXLAN packet encapsulation for each authentication request is performed on the edge device, so that configuration and management of VXLAN access authentication can be simplified.

Based on any one of the second aspect of this application or the first to the third embodiments of the second aspect of this application, in a fourth embodiment of the second aspect of this application, the first VNI is a default VNI for VXLAN authentication. In an embodiment, when the control point device receives a request related to VXLAN access authentication, the control point device performs VXLAN packet encapsulation on the request, where a header of a VXLAN packet carries the first VNI. The control point device may not only belong to the VXLAN network corresponding to the first VNI, but also belong to a VXLAN network corresponding to another VNI. The first VNI is used as the default VNI for VXLAN authentication, so that processing efficiency of the control point device can be improved.

A third aspect of this application provides a VTEP device, including:

a receiving unit, configured to receive a VXLAN authentication packet, where the VXLAN authentication packet is a VXLAN packet, the VXLAN authentication packet includes a VXLAN header and an authentication request sent by a terminal, the VXLAN header includes a first VXLAN network identifier VNI, and the authentication request includes an authentication credential.

a processing unit, configured to obtain permission of the terminal or a second VNI based on the authentication credential, where the permission of the terminal corresponds to the second VNI; and a sending unit, configured to send the permission of the terminal or the second VNI to a control point device, where the control point device is a device that encapsulates the authentication request into the VXLAN authentication packet.

Based on the third aspect of this application, in a first embodiment of the third aspect of this application, no data traffic runs on a VXLAN network corresponding to the first VNI.

Based on the third aspect of this application, in a second embodiment of the third aspect of this application, the receiving unit is further configured to receive a first VXLAN packet sent by the control point device, where the first VXLAN packet includes a first VXLAN header and a first hypertext transfer protocol HTTP request, and the first VXLAN header includes the first VNI.

The sending unit is further configured to send a second VXLAN packet to the control point device, where the second VXLAN packet includes a second VXLAN header and an HTTP redirect packet, the second VXLAN header includes the first VNI, and the HTTP redirect packet includes a uniform resource identifier URI of a portal server.

Based on any one of the third aspect of this application or the first and the second embodiments of the third aspect of this application, in a third embodiment of the third aspect of this application, the control point device is an edge device, and the VTEP device is a border device.

Based on any one of the third aspect of this application or the first to the third embodiments of the third aspect of this application, in a fourth embodiment of the third aspect of this application, the first VNI is a default VNI for VXLAN authentication.

For beneficial effects of the VTEP device in the third aspect of this application, refer to the descriptions of the VXLAN access authentication method in the first aspect.

A fourth aspect of this application provides a VTEP device, including:

a sending unit, configured to send a VXLAN authentication packet to an authentication point device, where the VXLAN authentication packet is a VXLAN packet, the VXLAN authentication packet includes a VXLAN header and an authentication request sent by a terminal, the VXLAN header includes a first VXLAN network identifier VNI, and the authentication request includes an authentication credential;

a receiving unit, configured to receive permission of the terminal or a second VNI, where the permission of the terminal corresponds to the second VNI, and the permission of the terminal or the second VNI is obtained by the authentication point device based on the authentication credential; and an encapsulation unit, configured to encapsulate a packet from the terminal into a VXLAN packet on a VXLAN network corresponding to the second VNI.

Based on the fourth aspect of this application, in a first embodiment of the fourth aspect of this application, no data traffic runs on a VXLAN network corresponding to the first VNI.

Based on the fourth aspect of this application, in a second embodiment of the fourth aspect of this application, the sending unit is further configured to send a first VXLAN packet to the authentication point device, where the first VXLAN packet includes a first VXLAN header and a first hypertext transfer protocol HTTP request, and the first VXLAN header includes the first VNI.

The receiving unit is further configured to receive a second VXLAN packet sent by the authentication point device, where the second VXLAN packet includes a second VXLAN header and an HTTP redirect packet, the second VXLAN header includes the first VNI, and the HTTP redirect packet includes a uniform resource identifier URI of a portal server.

Based on any one of the fourth aspect of this application or the first and the second embodiments of the fourth aspect of this application, in a third embodiment of the fourth aspect of this application, the VTEP device is an edge device, and the authentication point device is a border device.

Based on any one of the fourth aspect of this application or the first to the third embodiments of the fourth aspect of this application, in a fourth embodiment of the fourth aspect of this application, the first VNI is a default VNI for VXLAN authentication.

For beneficial effects of the VTEP device in the fourth aspect of this application, refer to the descriptions of the VXLAN access authentication method in the second aspect.

A fifth aspect of this application provides a VTEP device, including:

a processor and a transceiver.

The transceiver is configured to receive a VXLAN authentication packet, where the VXLAN authentication packet is a VXLAN packet, the VXLAN authentication packet includes a VXLAN header and an authentication request sent by a terminal, the VXLAN header includes a first VXLAN network identifier VNI, and the authentication request includes an authentication credential.

The processor is configured to obtain permission of the terminal or a second VNI based on the authentication credential, where the permission of the terminal corresponds to the second VNI.

The transceiver is further configured to send the permission of the terminal or the second VNI to a control point device, where the control point device is a device that encapsulates the authentication request into the VXLAN authentication packet.

A sixth aspect of this application provides a VTEP device, including:

a processor and a transceiver.

The processor is configured to perform VXLAN packet encapsulation on an authentication request to obtain a VXLAN authentication packet.

The transceiver is configured to send the VXLAN authentication packet to an authentication point device, where the VXLAN authentication packet is a VXLAN packet, the VXLAN authentication packet includes a VXLAN header and the authentication request sent by a terminal, the VXLAN header includes a first VXLAN network identifier VNI, and the authentication request includes an authentication credential.

The transceiver is further configured to receive permission of the terminal or a second VNI, where the permission of the terminal corresponds to the second VNI, and the permission of the terminal or the second VNI is obtained by the authentication point device based on the authentication credential.

The processor is further configured to encapsulate a packet from the terminal into a VXLAN packet on a VXLAN network corresponding to the second VNI.

A seventh aspect of this application provides a computer storage medium, where the computer storage medium stores instructions. When the instructions are executed on a computer, the computer is enabled to perform the method according to any one of the first aspect or the embodiments of the first aspect; or perform the method according to any one of the second aspect or the embodiments of the second aspect.

An eighth aspect of this application provides a computer program product. When the computer program product is run on a computer, the computer is enabled to perform the method according to any one of the first aspect or the embodiments of the first aspect; or perform the method according to any one of the second aspect or the embodiments of the second aspect.

DESCRIPTION OF EMBODIMENTS

Embodiments of this application provide a VXLAN access authentication method and a VTEP device, applied to the field of network communication, so that configuration complexity can be reduced when a VXLAN access authentication mode is modified or created.

VXLAN can build a layer 2 virtual network over any network with reachable routes. VXLAN gateways can be used to implement communication within a VXLAN network and between a VXLAN network and a conventional non-VXLAN network. VXLAN extends a layer 2 network by encapsulating original packets of terminals into UDP packets. That is, an Ethernet packet is encapsulated into an IP packet and transmitted within a network over a route, and no attention is required for a MAC address of a terminal. Through a routing network, migration of a terminal is not restricted by a network architecture.

During VXLAN packet encapsulation, a VXLAN header is first added to an original packet (such as an Ethernet frame) in a VXLAN packet encapsulation process. Then, the packet is encapsulated in a UDP header, and encapsulated by using an IP address and a MAC address of an underlay network as an outer header. Therefore, in addition to the original packet, a VXLAN packet further includes the VXLAN header, the outer UDP header, and the outer IP header.

A VTEP (VXLAN tunnel endpoints, VXLAN tunnel endpoint) device may encapsulate and decapsulate VXLAN packets. In an outer IP header of a VXLAN packet, a source IP address is an IP address of a source VTEP, and a destination IP address is an IP address of a destination VTEP. One pair of VTEP addresses corresponds to one VXLAN tunnel. After the source VTEP encapsulates a VXLAN packet, the source VTEP sends the encapsulated packet to the destination VTEP. The destination VTEP decapsulates the received encapsulated packet.

Figure 1:
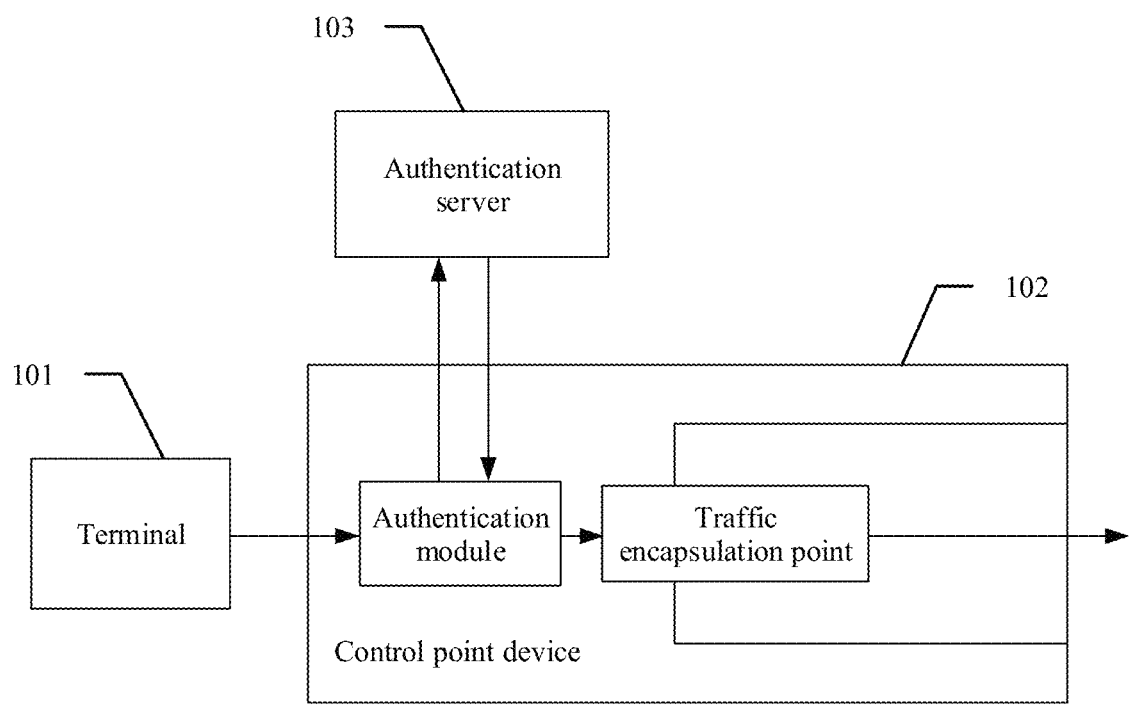
FIG. 1 is a schematic diagram of VXLAN access authentication.
Figure 2:
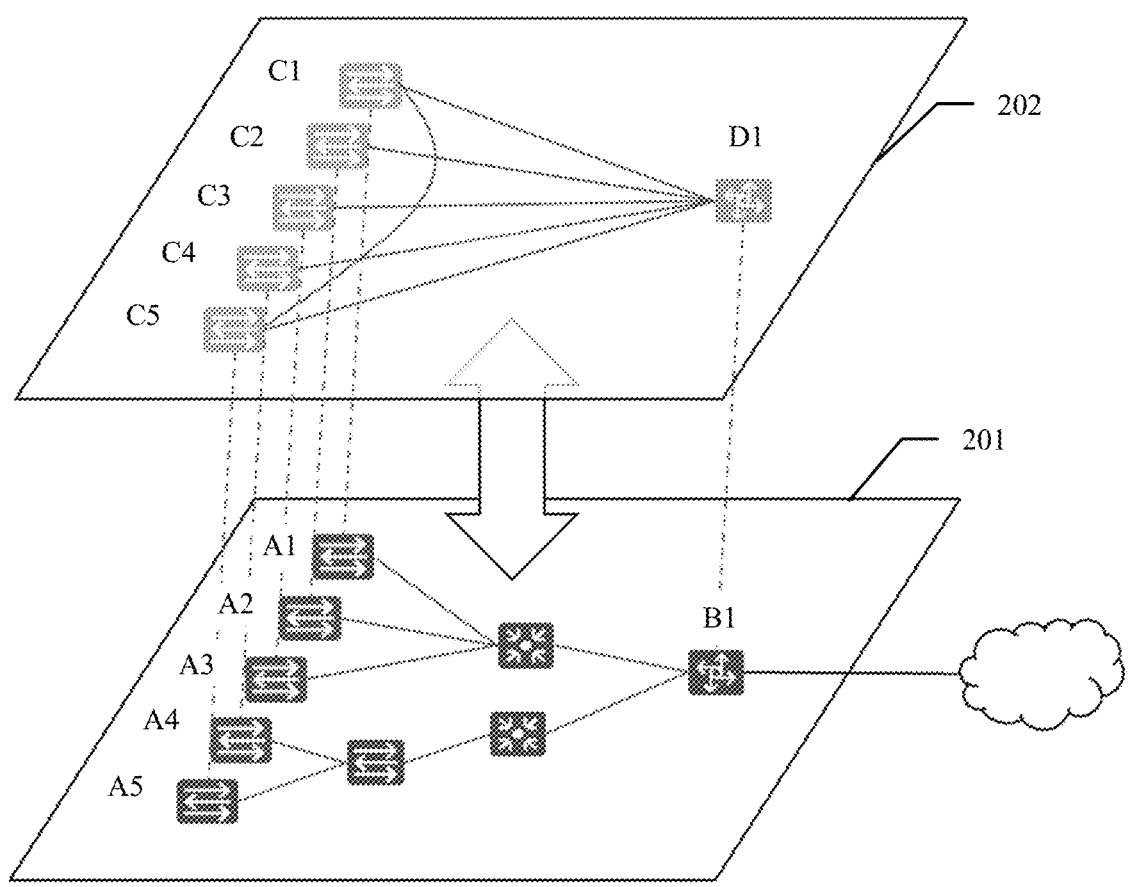
FIG. 2 is a schematic diagram of comparison between an underlay network and an overlay network.

Usually, for ease of differentiation and description, as shown in FIG. 2, a basic physical network is usually referred to as an underlay network 201, and a virtualized VXLAN network is referred to as an overlay network 202. In addition, virtual devices on the overlay network 202 are classified into two roles. One role represents an egress of the VXLAN network, and is referred to as a border device, for example, D1 in FIG. 2. The border device D1 is connected to an external network, is usually a layer 3 gateway of the VXLAN network, and usually corresponds to an egress gateway B1 of the underlay network. The egress gateway B1 may be a switch. The other role represents access of the VXLAN network and is referred to as an edge device, for example, C1 to C5 in FIG. 2. The edge device is a part of a VXLAN network that connects to a terminal. The edge device is usually corresponding to a network access device of the underlay network, for example, A1 to A5 in FIG. 2. The network access device may be usually a switch or a wireless access point (AP). C1 to C5 of the overlay network 202 in FIG. 2 respectively correspond to network access devices A1 to A5 of the underlay network 201. D1 corresponds to the egress gateway B1. The edge devices C1 to C5 and the border device D1 are all VTEP devices.

Figure 3:
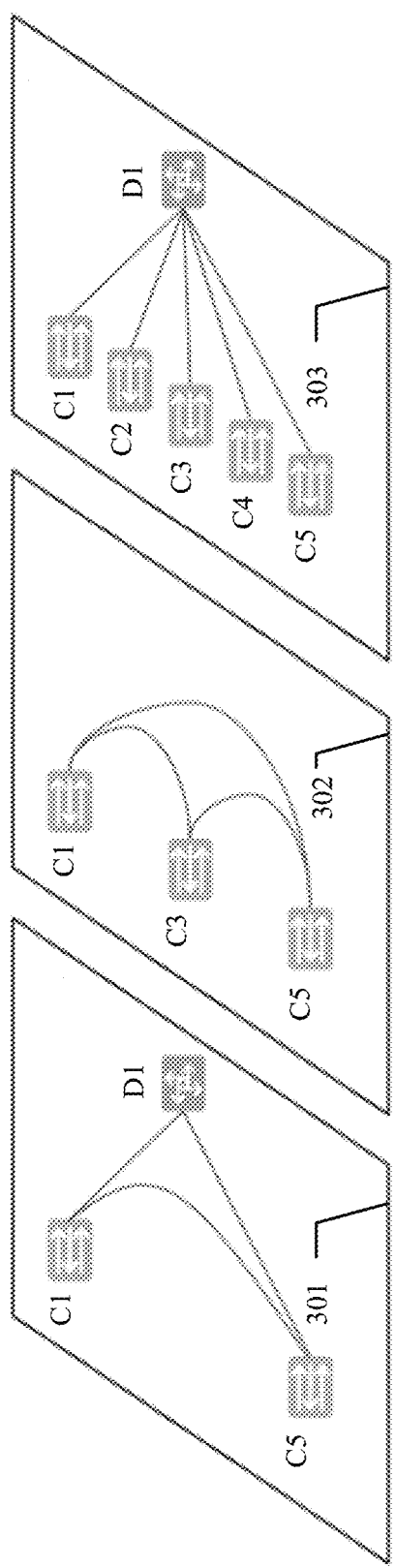
FIG. 3 is a schematic diagram of networking of different VNIs.

On a VXLAN network, VNIs are used to distinguish between VXLAN segments. Terminals on different VXLAN segments cannot communicate with each other at layer 2 directly. A VNI represents a tenant, a subnet, or a working group. A tenant may include one or more terminals. A VXLAN network corresponding to a VNI refers to all channels through which a VXLAN packet carrying the VNI passes when terminals of a tenant corresponding to the VNI communicate with each other at layer 2. The VXLAN technology can be used for networking, to isolate networks of different tenants. FIG. 3 is a schematic diagram of networking of different VNIs. A second VNI 301 includes an edge device C1, an edge device C5, and a border device D1. A third VNI 302 includes an edge device C1, an edge device C3, and an edge device C5. A fourth VNI 303 includes an edge device C1, an edge device C2, an edge device C3, an edge device C4, an edge device C5, and a border device D1. The second VNI 301, the third VNI 302, and the fourth VNI 303 all represent overlay networks. The following uses the second VNI 301 as an example for description. A VXLAN network corresponding to the second VNI 301 includes a VXLAN tunnel between the edge device C1 and the edge device C5, a VXLAN tunnel between the edge device C1 and the border device D1, and a VXLAN tunnel between the edge device C5 and the border device D1. A VXLAN header of a VXLAN packet transmitted through the VXLAN tunnel includes the second VNI. The second VNI represents an overlay network. An underlay network corresponding to the overlay network includes a network access device A1, a network access device A5, and an egress gateway B1. The underlay network may further include another device for implementing physical connectivity, for example, a switch between the network access device A1 and the egress gateway B1.

VXLAN access authentication is to perform authentication on a terminal to determine a VXLAN network that traffic data of the terminal should enter. If a VTEP device connected to the terminal has only one VXLAN network, VXLAN access authentication may be understood as determining whether to allow data traffic of the terminal to enter the VXLAN network.

VXLAN access authentication is performed on the underlay network, so that traffic of a terminal on which access authentication succeeds can be transmitted in the second VNI 301. Traffic of a terminal on which access authentication fails cannot enter the second VNI 301. In other words, VXLAN network traffic identification and access authentication are implemented by the underlay network. The VXLAN network corresponding to the second VNI 301 is actually only used as a traffic transmission network, and cannot perform management and control on traffic and access authentication of the terminal. If traffic and access authentication of a terminal need to be managed and controlled, for example, different access authentication modes need to be configured for different VNIs, it still depends on configuration of the overlay network, and conversion into the configuration of the overlay network is still required. Consequently, the configuration and process of the overlay network are intertwined with those of the underlay network, and configuration cannot be directly performed based on the VXLAN network. Understanding is difficult, and configuration is inconvenient. As a result, the configuration and operations are relatively complex. For example, an enterprise usually uses a VXLAN network to implement network isolation. Isolated VXLAN networks usually need to be directly configured based on service features. For example, different access authentication policies need to be configured for different types of VXLAN networks. For example, an 802.1x access authentication mode is used for an office network that may be accessed by a wired terminal and a wireless terminal, an 802.1x MAC address bypass authentication mode is used for a production network that can be accessed by only a wired terminal, and a Portal authentication mode is used for a guest network that can be accessed by only a wireless terminal. According to this configuration method, configuration needs to be performed on the underlay network. The configuration process and operation are complex.

In an embodiment of the application, VXLAN access authentication is performed on an overlay network, so that an underlay network and the overlay network are decoupled from each other. The underlay network is mainly responsible for interconnection and interworking of physical networks, to ensure IP reachability and reliability, and provide basic network connectivity. The overlay network is responsible for managing and controlling traffic and access authentication of a terminal to meet enterprises' network service requirements and provide flexible network service attributes. To perform VXLAN access authentication on an overlay network, an authentication request of a terminal needs to enter a VXLAN network before a VXLAN network that traffic of the terminal should enter is determined. In an embodiment of the application, an example in which the overlay network 202 in FIG. 2 is used as a first VNI 202 is used for description. VXLAN access authentication of the terminal is performed in the first VNI. After the authentication succeeds, data traffic of the terminal enters the second VNI 301.

The following describes a network framework in embodiments of this application.

Figure 4:
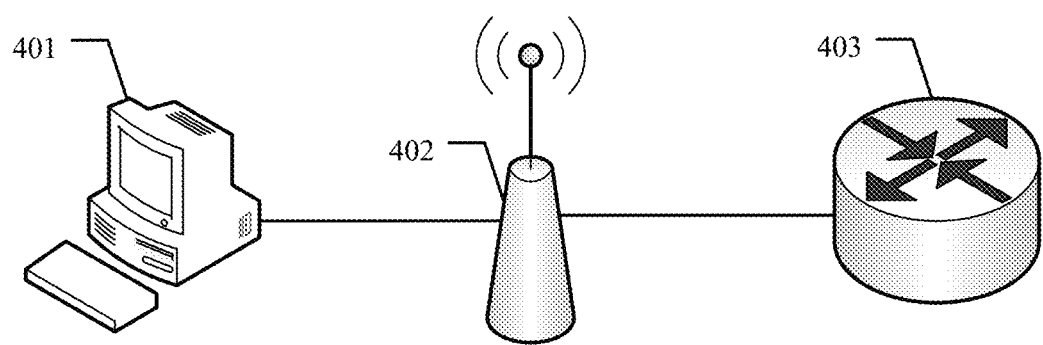
FIG. 4 is a schematic diagram of a network framework according to an embodiment of this application.

FIG. 4 is a schematic diagram of a network framework according to an embodiment of this application.

In FIG. 4, there is a terminal 401, a control point device 402, and an authentication point device 403.

The terminal 401 is connected to the control point device 402 in a wired or wireless manner. The terminal 401 may be a mobile phone, a tablet computer, an internet of things terminal device, a vehicle-mounted device, a wearable device, a computing device, or the like. A main function of the terminal 401 is to send an authentication request to the control point device 402, and after authentication succeeds, the terminal 401 forwards data traffic through the control point device 402. It should be determined that the terminal 401 may attempt to send to-be-forwarded data traffic to the control point device 402 before the authentication succeeds.

The control point device 402 is a VTEP device, and the VTEP device may be a switch, an AP, or the like. FIG. 4 is drawn by using an example in which the control point device 402 is an AP. The control point device 402 includes both a part corresponding to an underlay network and a part corresponding to an overlay network. FIG. 2 is used as an example for description. The control point device 402 is not only the edge device C1 in FIG. 2, but also the network access device A1. Main functions of the control point device 402 are to receive the authentication request sent by the control point device 402, perform VXLAN packet encapsulation on the authentication request to obtain a VXLAN authentication packet, send the VXLAN authentication packet to the authentication point device 403, and correspondingly forward the traffic of the terminal based on a reply of the authentication point device 403.

The authentication point device 403 is a VTEP device. Main functions of the authentication point device 403 are to receive the VXLAN authentication packet sent by the control point device 402, obtain permission of the terminal 401 or a second VNI based on the VXLAN authentication packet, and return an authentication result to the control point device 402. The authentication point device 403 may join only the VXLAN network corresponding to the first VNI, and does not join another VXLAN network. In this case, the authentication point device 403 may be configured to perform only access authentication. For example, the egress gateway B1 in FIG. 2 is used as the authentication point device 403, the overlay network 202 is used as the VXLAN network corresponding to the first VNI, and the authentication point device 403 is in the VXLAN network corresponding to the first VNI. The overlay network 302 in FIG. 3 is used as a VXLAN network corresponding to the second VNI, and the authentication point device 403 does not join the VXLAN network corresponding to the second VNI.

The foregoing describes the network framework in embodiments of this application, and the following describes a VXLAN access authentication method in embodiments of this application. For example, features or content marked by dashed lines in the accompanying drawings in embodiments of this application may be understood as optional operations or optional structures in the embodiments.

Figure 5:
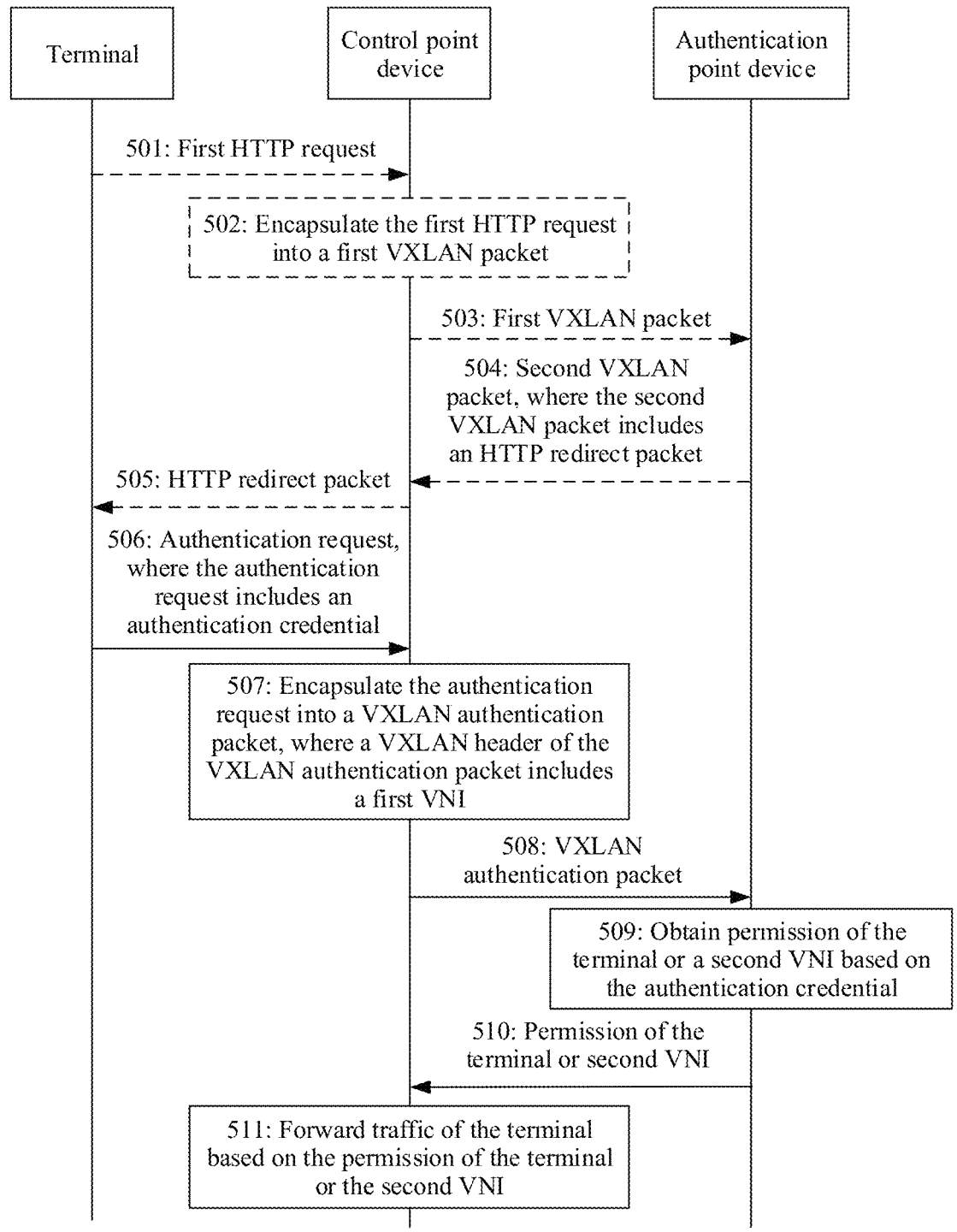
FIG. 5 is a schematic flowchart of a VXLAN authentication method according to an embodiment of this application.

FIG. 5 is a schematic flowchart of a VXLAN access authentication method according to an embodiment of this application.

In operation 501, a terminal sends a first HTTP request to a control point device.

After the terminal is connected to the control point device, the terminal opens a browser to access any HTTP web page. A process in which the terminal accesses any HTTP web page is a process in which the terminal sends the first HTTP request to the control point device. If the terminal accesses any HTTPS web page, the terminal sends a first HTTPS request to the control point device.

In operation 502, the control point device encapsulates the first HTTP request into a first VXLAN packet.

After receiving the first HTTP request sent by the terminal, the control point device performs VXLAN packet encapsulation on the first HTTP request to obtain the first VXLAN packet. The first VXLAN packet includes a first VXLAN header and the first HTTP request, and the first VXLAN header includes a first VNI. A source IP address of the first VXLAN packet is an IP address of the control point device, and a destination IP address of the first VXLAN packet is an IP address of an authentication point device.

In operation 503, the control point device sends the first VXLAN packet to the authentication point device.

Both the control point device and the authentication point device are network devices belonging to the first VNI, and the control point device and the authentication point device may directly communicate with each other by using a VXLAN tunnel.

In operation 504, the authentication point device sends a second VXLAN packet to the control point device, where the second VXLAN packet includes an HTTP redirect packet.

After the authentication point device receives the first VXLAN packet sent by the control point device, the authentication point device decapsulates the first VXLAN packet to obtain the first HTTP request. The authentication point device reads a web address requested to be accessed in the first HTTP request. If the web address is a web address of a portal server or a specified freely accessible web address, the authentication point device returns a third VNI to the control point device. Data traffic of the terminal is forwarded by the control point device to a VXLAN tunnel corresponding to the third VNI, and may reach the portal server or a server of the freely accessible web address. If the web address is not the foregoing web address, that is, is not the web address of the portal server or the specified freely accessible web address, the authentication point device sends the second VXLAN packet to the control point device. The second VXLAN packet includes a second VXLAN header and the HTTP redirect packet, the second VXLAN header includes the first VNI, and the HTTP redirect packet includes a URI of the portal server. If a VTEP device connected to the portal server is not in the first VNI, the second VXLAN packet may further include a fourth VNI, used to indicate the control point device to forward traffic that is from the terminal to the portal server.

In operation 505, the control point device sends the HTTP redirect packet to the terminal.

After the control point device receives the second VXLAN packet sent by the authentication point device, the control point device decapsulates the second VXLAN packet to obtain the HTTP redirect packet. After receiving the HTTP redirect packet, the terminal can access the URI of the portal server. A process in which the terminal accesses the URI may be understood as a process in which the terminal sends a second HTTP request to the control point device.

After receiving the second HTTP request sent by the terminal, the control point device performs VXLAN packet encapsulation on the second HTTP request to obtain a third VXLAN packet. The third VXLAN packet includes a third VXLAN header and the second HTTP request, and the third VXLAN header includes the first VNI. A source IP address of the third VXLAN packet is the IP address of the control point device, and a destination IP address of the third VXLAN packet is the IP address of the authentication point device. The control point device sends the third VXLAN packet to the authentication point device through the VXLAN tunnel.

The authentication point device decapsulates the third VXLAN packet to obtain the second HTTP request. The authentication point device obtains the fourth VNI based on the URI of the portal server in the second HTTP request, and performs VXLAN packet encapsulation on the fourth VNI to obtain a fourth VXLAN packet. The fourth VXLAN packet includes a fourth VXLAN header and the fourth VNI, and the fourth VXLAN header includes the first VNI. The authentication point device sends the fourth VXLAN packet to the control point device.

After receiving the fourth VXLAN packet, the control point device decapsulates the fourth VXLAN packet to obtain the fourth VNI. The control point device performs VXLAN packet encapsulation on the second HTTP request again to obtain a fifth VXLAN packet. The fifth VXLAN packet includes a fifth VXLAN header and the second HTTP request, and the fifth VXLAN header includes the fourth VNI. A source IP address of the fifth VXLAN packet is the IP address of the control point device, and a destination IP address of the fifth VXLAN packet is an IP address of the VTEP device connected to the portal server. The control point device sends the fifth VXLAN packet to the portal server through the VXLAN tunnel.

In an embodiment, if the second VXLAN packet includes the fourth VNI, the control point device may not send the third VXLAN packet to the authentication point device. The control point device performs VXLAN packet encapsulation on the second HTTP request to obtain the fifth VXLAN packet, and sends the fifth VXLAN packet to the portal server.

In operation 506, the terminal sends an authentication request to the control point device, where the authentication request includes an authentication credential.

After the terminal accesses the URI of the portal server, the portal server returns an authentication page to the terminal. The terminal enters the authentication credential on the authentication page, and sends the authentication request to the control point device, where the authentication request includes the authentication credential, and the authentication credential may include a user name and a password. Because the terminal uses HTTP/HTTPS for Portal authentication, the authentication request is HTTP POST or HTTP GET. In HTTP POST, the authentication credential is placed in a body of an HTTP request packet and is not a part of the URL. In HTTP GET, the authentication credential is appended to the URL, and the URL and the authentication credential are separated by "?".

In an embodiment, the authentication credential further includes a device type of the terminal, and the device type of the terminal is determined based on a connection manner between the terminal and the control point device. If the terminal and the control point device are connected in a wireless manner, the terminal is a wireless device; or if the terminal and the control point device are connected in a wired manner, the terminal is a wired device.

In an embodiment, none of operation 501 to operation 505 may be performed. Operation 501 to operation 505 need to be performed only when access authentication is performed in a Portal authentication mode. When another access authentication mode is used, the terminal may directly send the authentication request to the control point device. For example, the terminal may use 802.1X authentication. In the 802.1X authentication, the terminal sends the authentication request to the control point device by using the extensible authentication protocol (EAP). The authentication credential in the authentication request may be carried in different packets. For example, the user name in the authentication credential is sent to the control point device by using an identity-type response packet (EAP-Response/Identity), and the password in the authentication credential is sent to the control point device by using an EAP-Response packet or an MD5 Challenge packet.

In operation 507, the control point device encapsulates the authentication request into a VXLAN authentication packet, where a VXLAN header of the VXLAN authentication packet includes the first VNI.

After receiving the authentication request sent by the terminal, the control point device performs VXLAN packet encapsulation on the authentication request to obtain the VXLAN authentication packet. The VXLAN authentication packet includes the VXLAN header and the authentication request, and the VXLAN header includes the first VNI. A source IP address of the VXLAN authentication packet is the IP address of the control point device, and a destination IP address of the VXLAN authentication packet is the IP address of the authentication point device.

Figure 6:
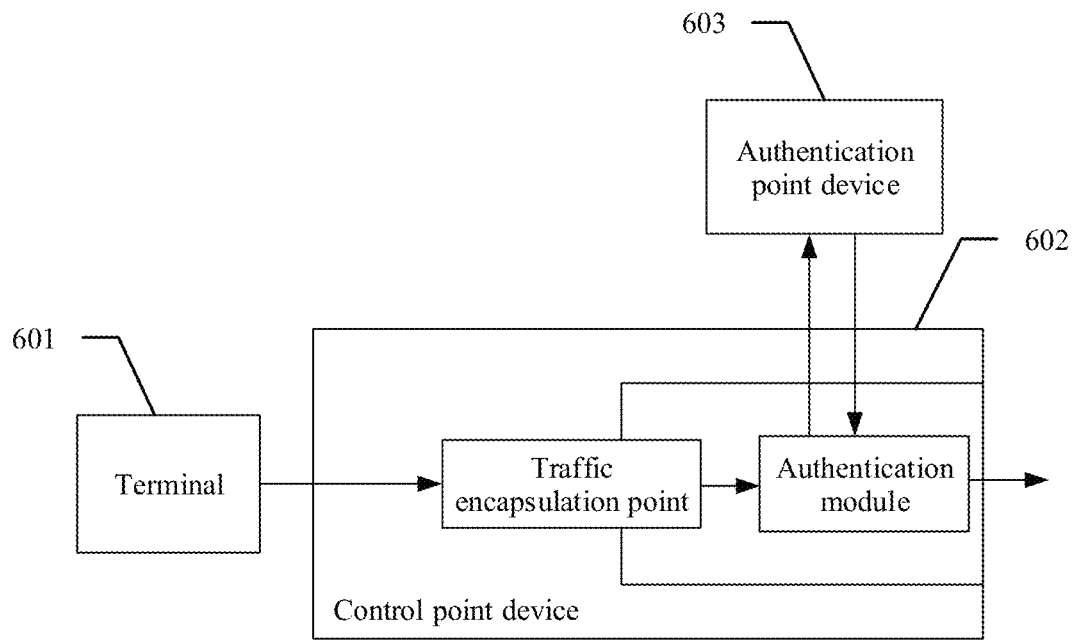
FIG. 6 is a schematic diagram of VXLAN access authentication according to an embodiment of this application.

Different from performing VXLAN access authentication in an underlay network, after receiving the authentication request, the control point device performs VXLAN packet encapsulation on the authentication request, so that the authentication request can enter the first VNI. FIG. 6 is a schematic diagram of AN access authentication according to an embodiment of this application. In FIG. 6, there is a terminal 601, an authentication point device 603, and a control point device 602. The control point device 602 supports an underlay network and an overlay network. After an authentication request sent by the terminal 601 arrives at the control point device 602, the authentication request is directly encapsulated at a traffic encapsulation point, so that the authentication request enters the overlay network.

In an embodiment, in a case in which none of operation 501 to operation 505 is performed, no data traffic is run on the VXLAN network corresponding to the first VNI, that is, a packet that is related to the terminal and that carries the first VNI includes only the VXLAN authentication packet and a reply from the authentication point device to the control point device. The packet related to the terminal is a packet sent by the terminal.

In an embodiment, the first VNI is a default VNI for VXLAN authentication. That is, after receiving a packet related to VXLAN access authentication, the control point device performs VXLAN packet encapsulation on the packet by using the first VNI by default. The packet related to VXLAN access authentication includes the authentication request, the first VXLAN packet, the third VXLAN packet, and the like.

In an embodiment, the control point device is an edge device, and the authentication point device is a border device. In an embodiment of the application, an example in which the control point device is an edge device and the authentication point device is a border device is used for description. In an embodiment, the control point device may be a border device, and the authentication point device may be an edge device.

In operation 508, the control point device sends the VXLAN authentication packet to the authentication point device.

The control point device sends the VXLAN authentication packet to the authentication point device through the VXLAN tunnel corresponding to the first VNI.

In operation 509, the authentication point device obtains the permission of the terminal or the second VNI based on the authentication credential.

The authentication point device receives the VXLAN authentication packet, and decapsulates the VXLAN authentication packet to obtain the authentication request. The authentication point device obtains, based on the authentication credential in the authentication request, the permission of the terminal or the second VNI. The permission of the terminal refers to whether the control point device allows the data traffic of the terminal to pass. If the data traffic of the terminal is allowed to pass, the permission of the terminal may include the second VNI. The authentication point device has a mapping relationship between the authentication credential and the permission of the terminal. Based on the mapping relationship, the authentication point device may obtain the permission of the terminal corresponding to the authentication credential, or obtain the second VNI.

In an embodiment, the authentication point device is connected to an authentication point server. After obtaining the authentication request, the authentication point device sends the authentication credential to the authentication point server. The authentication point server includes the mapping relationship between the authentication credential and the permission of the terminal. After the authentication point server obtains the permission of the terminal or the second VNI based on the authentication credential, the authentication point server sends the permission of the terminal or the second VNI to the authentication point device.

In an embodiment, if the authentication credential further includes the device type of the terminal, the authentication point device may obtain the permission of the terminal or the second VNI based on the user name and the device type of the terminal. For example, the user name is Zhang San, and terminals of different device types are used to send authentication requests to the control point device. If the terminal is a wireless device, the authentication point device learns, based on the authentication credential, that the permission of the terminal is "passing prohibited"; or if the terminal is a wired device, the authentication point device obtains the second VNI based on the authentication credential.

In operation 510, the authentication point device sends the permission of the terminal or the second VNI to the control point device.

The authentication point device performs VXLAN packet encapsulation on the permission of the terminal or the second VNI, and a VXLAN header of an obtained VXLAN packet includes the first VNI. The authentication point device sends the VXLAN packet to the control point device through the VXLAN tunnel corresponding to the first VNI.

In operation 511, the control point device forwards the traffic of the terminal based on the permission of the terminal or the second VNI.

If the control point device receives the second VNI, after receiving the data traffic of the terminal, the control point device performs VXLAN packet encapsulation on the data traffic of the terminal, where a VXLAN header of an obtained VXLAN packet includes the second VNI; and forwards the VXLAN packet through the VXLAN tunnel corresponding to the second VNI.

If the control point device receives the permission of the terminal, for example, a name or a group, the authentication point device first searches a mapping table to obtain the second VNI corresponding to the name or the group; then performs VXLAN packet encapsulation on the data traffic of the terminal, where a VXLAN header of an obtained VXLAN packet includes the second VNI; and forwards the VXLAN packet through the VXLAN tunnel corresponding to the second VNI.

The foregoing describes the VXLAN access authentication method in embodiments of this application, and the following describes a VTEP device in embodiments of this application.

Figure 7:
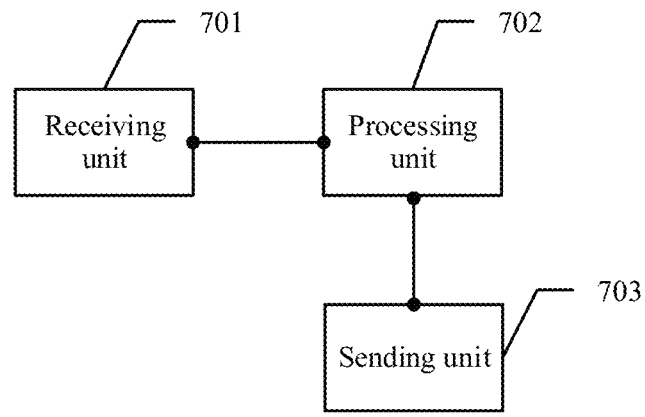
FIG. 7 is a schematic diagram of a structure of a VTEP device according to an embodiment of this application.

FIG. 7 is a schematic diagram of a structure of a VTEP device according to an embodiment of this application.

A receiving unit 701 is configured to receive a VXLAN authentication packet, where the VXLAN authentication packet is a VXLAN packet, the VXLAN authentication packet includes a VXLAN header and an authentication request sent by a terminal, the VXLAN header includes a first VXLAN network identifier VNI, and the authentication request includes an authentication credential.

A processing unit 702 is configured to obtain permission of the terminal or a second VNI based on the authentication credential, where the permission of the terminal corresponds to the second VNI.

A sending unit 703 is configured to send the permission of the terminal or the second VNI to a control point device, where the control point device is a device that encapsulates the authentication request into the VXLAN authentication packet.

Because the VXLAN authentication packet is a VXLAN packet, VXLAN access authentication is performed on an overlay network. VXLAN access authentication is performed on the overlay network, so that corresponding configuration needs to be performed on only the overlay network when a VXLAN access authentication mode is modified or created. This reduces configuration complexity.

Based on the VTEP device in FIG. 7, the VTEP device may further include the following.

In an embodiment, no data traffic runs on a VXLAN network corresponding to the first VNI.

In an embodiment, the receiving unit 701 is further configured to receive a first VXLAN packet sent by the control point device, where the first VXLAN packet includes a first VXLAN header and a first hypertext transfer protocol HTTP request, and the first VXLAN header includes the first VNI.

The sending unit 703 is further configured to send a second VXLAN packet to the control point device, where the second VXLAN packet includes a second VXLAN header and an HTTP redirect packet, the second VXLAN header includes the first VNI, and the HTTP redirect packet includes a uniform resource identifier URI of a portal server.

In an embodiment, the control point device is an edge device, and the VTEP device is a border device.

In an embodiment, the first VNI is a default VNI for VXLAN authentication.

Figure 8:
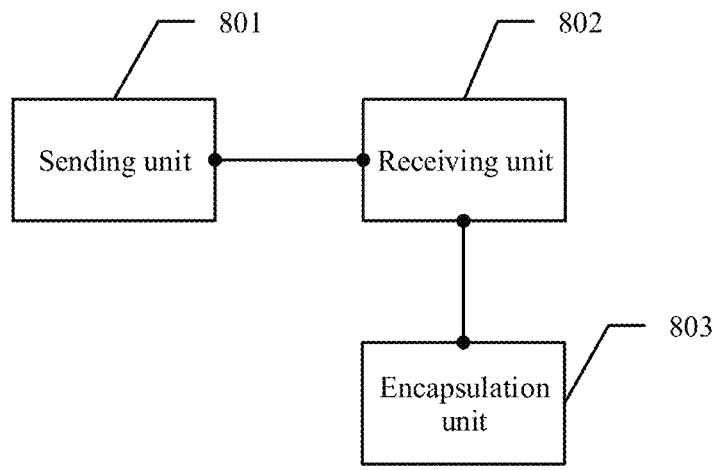
FIG. 8 is a schematic diagram of another structure of a VTEP device according to an embodiment of this application.

FIG. 8 is a schematic diagram of another structure of a VTEP device according to an embodiment of this application.

A sending unit 801 is configured to send a VXLAN authentication packet to an authentication point device, where the VXLAN authentication packet is a VXLAN packet, the VXLAN authentication packet includes a VXLAN header and an authentication request sent by a terminal, the VXLAN header includes a first VXLAN network identifier VNI, and the authentication request includes an authentication credential.

A receiving unit 802 is configured to receive permission of the terminal or a second VNI, where the permission of the terminal corresponds to the second VNI, and the permission of the terminal or the second VNI is obtained by the authentication point device based on the authentication credential.

An encapsulation unit 803 is configured to encapsulate a packet from the terminal into a VXLAN packet on a VXLAN network corresponding to the second VNI.

Based on the VTEP device in FIG. 8, the VTEP device may further include the following.

In an embodiment, no data traffic runs on a VXLAN network corresponding to the first VNI.

In an embodiment, the sending unit 801 is further configured to send a first VXLAN packet to the authentication point device, where the first VXLAN packet includes a first VXLAN header and a first hypertext transfer protocol HTTP request, and the first VXLAN header includes the first VNI.

The receiving unit 802 is further configured to receive a second VXLAN packet sent by the authentication point device, where the second VXLAN packet includes a second VXLAN header and an HTTP redirect packet, the second VXLAN header includes the first VNI, and the HTTP redirect packet includes a uniform resource identifier URI of a portal server.

In an embodiment, the VTEP device is an edge device, and the authentication point device is a border device.

In an embodiment, the first VNI is a default VNI for VXLAN authentication.

Figure 9:
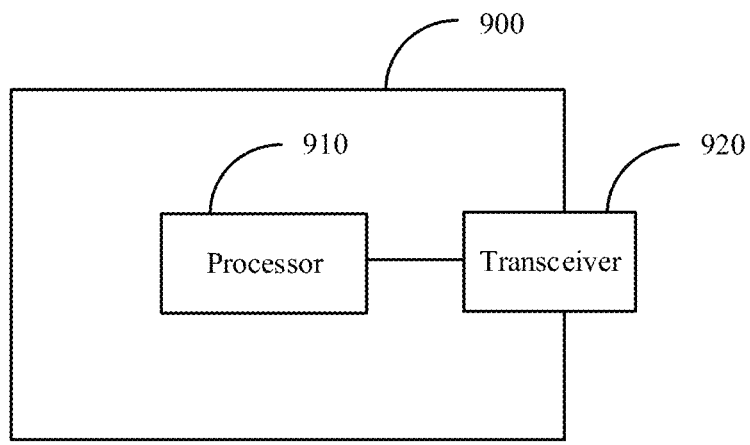
FIG. 9 is a schematic diagram of another structure of a VTEP device according to an embodiment of this application.

FIG. 9 is a schematic diagram of another structure of a VTEP device according to an embodiment of this application.

As shown in FIG. 9, a VTEP device 900 includes a processor 910 and a transceiver 920 coupled to the processor 910. The VTEP device 900 may be the authentication point device in FIG. 4, FIG. 5, and FIG. 6. The processor 910 may be a central processing unit (CPU), a network processor (NP), or a combination of a CPU and an NP. The processor may alternatively be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof. The processor 910 may be one processor, or may include a plurality of processors.

The transceiver 920 is a hardware electronic device configured to receive and/or send an electrical signal between devices. The transceiver 920 includes an optical fiber transceiver, a radio frequency transceiver, a CAN transceiver, a broadband communications transceiver, and the like. The transceiver 920 is configured to receive a VXLAN authentication packet, where the VXLAN authentication packet is a VXLAN packet, the VXLAN authentication packet includes a VXLAN header and an authentication request sent by a terminal, the VXLAN header includes a first VXLAN network identifier VNI, and the authentication request includes an authentication credential.

The processor 910 is configured to obtain permission of the terminal or a second VNI based on the authentication credential, where the permission of the terminal corresponds to the second VNI.

The transceiver 920 is further configured to send the permission of the terminal or the second VNI to a control point device, where the control point device is a device that encapsulates the authentication request into the VXLAN authentication packet.

In an embodiment, the VTEP device 900 further includes a memory. The memory may include a volatile memory, for example, a random access memory RAM); or the memory may include a non-volatile memory, for example, a read-only memory (ROM), a flash memory, a hard disk drive (HDD), or a solid-state drive (SSD); or the memory may include a combination of the foregoing types of memories.

In addition, after executing computer readable instructions in the memory, the processor 910 may perform, according to the computer readable instructions, all operations that can be performed by the VTEP device, for example, an operation performed by the authentication point device in the embodiment corresponding to FIG. 5.

FIG. 9 is a schematic diagram of another structure of a VTEP device according to an embodiment of this application.

As shown in FIG. 9, a VTEP device 900 includes a processor 910 and a transceiver 920 coupled to the processor 910. The VTEP device 900 may be the control point device in FIG. 4, FIG. 5, and FIG. 6. The processor 910 may be a central processing unit (CPU), a network processor (NP), or a combination of a CPU and an NP. The processor may alternatively be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof. The processor 910 may be one processor, or may include a plurality of processors.

The processor 910 is configured to perform VXLAN packet encapsulation on an authentication request to obtain a VXLAN authentication packet.

The transceiver 920 is a hardware electronic device configured to receive and/or send an electrical signal between devices. The transceiver 920 includes an optical fiber transceiver, a radio frequency transceiver, a CAN transceiver, a broadband communications transceiver, and the like. The transceiver 920 is configured to send the VXLAN authentication packet to an authentication point device. The VXLAN authentication packet is a VXLAN packet, the VXLAN authentication packet includes a VXLAN header and the authentication request sent by a terminal, the VXLAN header includes a first VXLAN network identifier VNI, and the authentication request includes an authentication credential. The transceiver 920 is further configured to receive permission of the terminal or receive a second VNI, where the permission of the terminal corresponds to the second VNI. The permission of the terminal or the second VNI is obtained by the authentication point device based on the authentication credential.

The processor 910 is further configured to encapsulate a packet from the terminal into a VXLAN packet on a VXLAN network corresponding to the second VNI.

In an embodiment, the VTEP device 900 further includes a memory. The memory may include a volatile memory, for example, a random access memory (RAM); or the memory may include a non-volatile memory, for example, a read-only memory (ROM), a flash memory, a hard disk drive HDD), or a solid-state drive (SSD); or the memory may include a combination of the foregoing types of memories.

In addition, after executing computer readable instructions in the memory, the processor 910 may perform, according to the computer readable instructions, all operations that can be performed by the VTEP device, for example, an operation performed by the control point device in the embodiment corresponding to FIG. 5.

In the several embodiments provided in this application, it should be understood that the disclosed system, apparatus, and method may be implemented in other manners. For example, the foregoing apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or the units may be implemented in electrical, mechanical, or other forms.

The units described as separate parts may or may not be physically separate, and parts displayed as units may or may not be physical units, may be located in one location, or may be distributed on a plurality of network units. Some or all of the units may be selected based on actual requirements to achieve the objective of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium, and includes several instructions for instructing a computer device (which may be a personal computer, a server, or a network device) to perform all or some of the operations of the methods described in embodiments of this application. The foregoing storage medium includes any medium that can store program code, such as a flash drive, a removable hard disk, a ROM, a RAM, a magnetic disk, or an optical disc.

What is claimed is:

1. A virtual extensible local area network (VXLAN) access authentication method, comprising:
   receiving, by an authentication point device, a first VXLAN packet sent by a control point device, wherein the first VXLAN packet comprises a first VXLAN header and a first hypertext transfer protocol (HTTP) request, and wherein the first VXLAN header comprises a first VXLAN network identifier (VNI);
   receiving, by the authentication point device, a VXLAN authentication packet comprising a VXLAN header and an authentication request sent by a terminal, wherein the VXLAN header comprises a first VNI, and wherein the authentication request comprises an authentication credential;
   obtaining, by the authentication point device, permission of the terminal including passing prohibited or a second VNI based on the authentication credential, wherein the permission of the terminal corresponds to the second VNI; and
   sending, by the authentication point device, the permission of the terminal or the second VNI to the control point device that encapsulates the authentication request into the VXLAN authentication packet.

2. The method according to claim 1, wherein no data traffic runs on a VXLAN network corresponding to the first VNI.

3. The method according to claim 1, wherein before receiving the VXLAN authentication packet and after receiving the first VXLAN packet, the method further comprises:
   sending, by the authentication point device, a second VXLAN packet to the control point device, wherein the second VXLAN packet comprises a second VXLAN header and an HTTP redirect packet, wherein the second VXLAN header comprises the first VNI, and wherein the HTTP redirect packet comprises a uniform resource identifier (URI) of a portal server.

4. The method according to claim 1, wherein the control point device is an edge device, and wherein the authentication point device is a border device.

5. The method according to claim 1, wherein the first VNI is a default VNI for VXLAN authentication.

6. A virtual extensible local area network (VXLAN) access authentication method, comprising:
   sending, by a control point device, a first VXLAN packet to an authentication point device, wherein the first VXLAN packet comprises a first VXLAN header and a first hypertext transfer protocol (HTTP) request, and wherein the first VXLAN header comprises a first VXLAN network identifier (VNI);

sending, by the control point device, a VXLAN authentication packet to the authentication point device comprising a VXLAN header and an authentication request sent by a terminal, wherein the VXLAN header comprises the first VNI, and wherein the authentication request comprises an authentication credential;

receiving, by the control point device, permission of the terminal including passing prohibited or a second VNI, wherein the permission of the terminal corresponds to the second VNI, and wherein the permission of the terminal or the second VNI is obtained by the authentication point device based on the authentication credential; and encapsulating, by the control point device, a packet from the terminal into a VXLAN packet on a VXLAN network corresponding to the second VNI.

7. The method according to claim 6, wherein no data traffic runs on the VXLAN network corresponding to the first VNI.

8. The method according to claim 6, wherein before the-sending the VXLAN authentication packet to the authentication point device and after sending the first VXLAN packet, the method further comprises:

receiving, by the control point device, a second VXLAN packet sent by the authentication point device, wherein the second VXLAN packet comprises a second VXLAN header and an HTTP redirect packet, wherein the second VXLAN header comprises the first VNI, and wherein the HTTP redirect packet comprises a uniform resource identifier (URI) of a portal server.

9. The method according to claim 6, wherein the control point device is an edge device, and wherein the authentication point device is a border device.

10. The method according to claim 6, wherein the first VNI is a default VNI for VXLAN authentication.

11. A virtual extensible local area network (VXLAN) tunnel endpoint (VTEP) device, comprising:

a receiver, configured to;

receive a first VXLAN packet sent by a control point device, wherein the first VXLAN packet comprises a first VXLAN header and a first hypertext transfer protocol (HTTP) request, and the first VXLAN header comprises a first VXLAN network identifier (VNI);

receive a VXLAN authentication packet, wherein the VXLAN authentication packet is a VXLAN packet, the VXLAN authentication packet comprises a VXLAN header and an authentication request sent by a terminal, the VXLAN header comprises the first VNI, and the authentication request comprises an authentication credential;

a processor, configured to obtain permission of the terminal including passing prohibited or a second VNI based on the authentication credential, wherein the permission of the terminal corresponds to the second VNI; and a transmitter, configured to send the permission of the terminal or the second VNI to the control point device, wherein the control point device is a device that encapsulates the authentication request into the VXLAN authentication packet.

12. The device according to claim 11, wherein no data traffic runs on a VXLAN network corresponding to the first VNI.

13. The device according to claim 11, wherein the transmitter is further configured to send a second VXLAN packet to the control point device, wherein the second VXLAN packet comprises a second VXLAN header and an HTTP redirect packet, the second VXLAN header comprises the first VNI, and the HTTP redirect packet comprises a uniform resource identifier (URI) of a portal server.

14. The device according to claim 11, wherein the control point device is an edge device, and an authentication point device is a border device.

15. The device according to claim 11, wherein the first VNI is a default VNI for VXLAN authentication.

\* \* \* \* \*